Feb. 2, 1943.  E. S. McLARN  2,309,971
DROP WIRE SUPPORT
Filed April 11, 1940  3 Sheets-Sheet 1

INVENTOR.
ERNEST S. McLARN
BY
ATTORNEY.

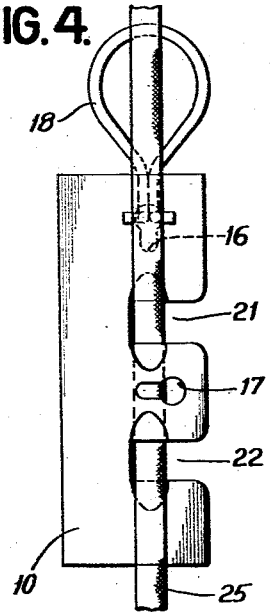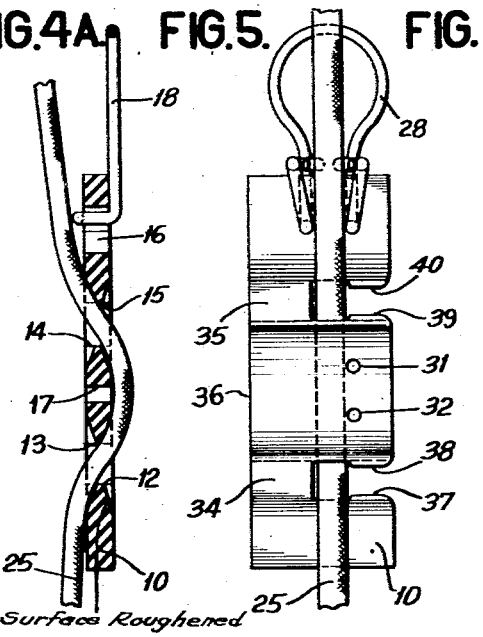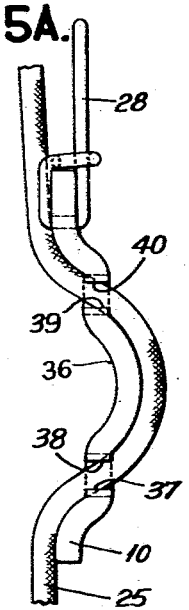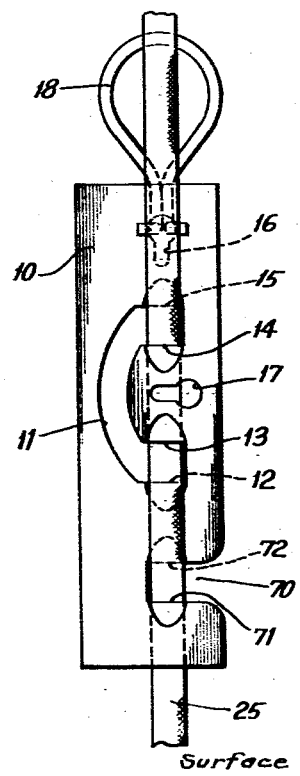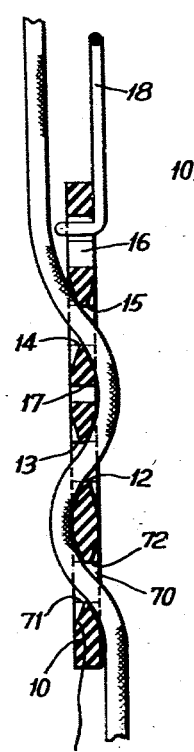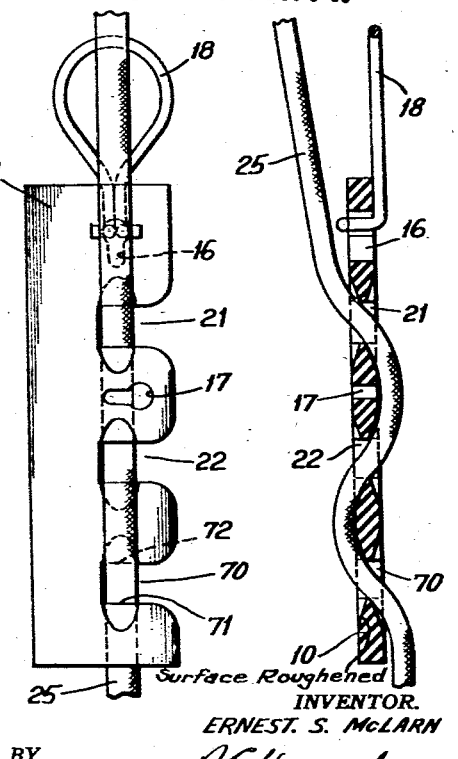

Feb. 2, 1943. E. S. McLARN 2,309,971
DROP WIRE SUPPORT
Filed April 11, 1940 3 Sheets-Sheet 3

INVENTOR.
ERNEST S. McLARN
BY
RCHopgood
ATTORNEY.

Patented Feb. 2, 1943

2,309,971

UNITED STATES PATENT OFFICE 2,309,971

DROP WIRE SUPPORT

Ernest S. McLarn, Manhasset, N. Y., assignor to International Standard Electric Corporation, New York, N. Y., a corporation of Delaware Application April 11, 1940, Serial No. 329,061

3 Claims. (Cl. 174—175)

This invention relates to drop wire supports and more particularly to drop wire supports which will replace both the drop wire supporting clamps and supporting clips now generally in use.

Drop wire supporting clips at present generally in use comprise a body made of metal provided with a slot in which the wire is placed, an integrally formed clamping member on said body either side of said slot, and an integrally formed mounting bale. The wire is threaded through the slots and the clamping member is then bent down to said wire. The surface of said clamping member and the body adjacent thereto is provided with corrugations to bite into the insulation of the wire to retain it in place.

Drop wire clamps generally are formed with two channel shaped members slidingly fitted together and formed with corrugated surfaces to tightly clamp the wire insulation, a bale for mounting the clamps being permanently fastened to the main body thereof.

In practice both these types of supports are a frequent source of failure. They are of necessity made of metal to obtain needed strength because of their form. Since they are forced tightly into the insulation they tend to wear through the insulation causing a short circuit through the metal of the support.

Moreover, the tight clamping of the wire together with the collection of dirt prevents moisture which enters thereat from readily drying off, causing a tendency to break down the insulation by rotting.

Furthermore, since the units are made of material which is of value for other purposes, such as is the case with copper, they are subject to theft. This latter feature is of importance particularly in places where copper is imported subject to high tariff rate.

According to my invention these disadvantages are overcome by making a drop wire support in the form of a single rectangular body in which are provided wire retaining slots. The wire is retained in place by the shape of the slots and the tension of the wire alone, without any additional clamping means forced into the insulation. As a consequence added pressure which may cause injury to the wire insulation and the formation of pockets for accumulation of dirt and moisture are avoided.

Furthermore, since no clamping pressure is required of the supporting unit, it may be made of insulating material, avoiding the dangers of short circuits.

The supporting unit according to my invention is light of weight, and is provided with separate supporting bales, so that supporting bales of any desired lengths may be interchangeably used.

By providing bale retaining apertures in the end and side of the support, the unit may be interchangeably used as a wire clip or clamp, thus reducing the number of different types of units necessary to keep in stock.

Because of the absence of clamping parts it is easy, with the support according to my invention, to attach wire to the support and to take up or let out slack in a wire already in the support.

The support according to my invention may be used with single insulated wires, parallel or twisted wires or other forms thereof.

While I have outlined above the general form of and advantages of my invention a better understanding of my invention, together with further objects and advantages thereof will be had from the particular description of a few preferred embodiments thereof made in connection with the accompanying drawings in which Figs. 1 and 1A show plan and cross-sectional views, respectively, of a drop wire support in accordance with my invention utilized as a clamp;

Figs. 4, 4A, show respectively plan and cross-sectional views of a modified form of support in accordance with my invention used as a clamp.

Figs. 5 and 5A show still another modified form of drop wire support in accordance with my invention, in plan and side view.

Figs. 6, 6A, 7 and 7A show other modified forms of the arrangement shown in Figs. 1–4.

Figure 1:
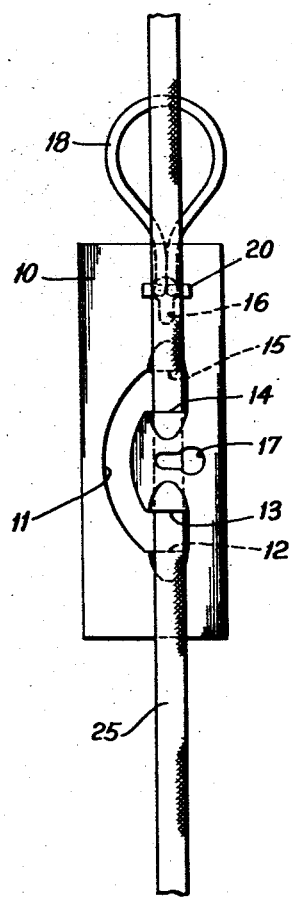
Figure 1A:
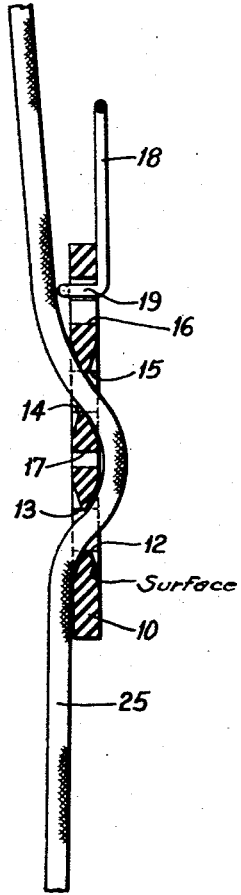

In Figs. 1 and 1A of my invention is disclosed an embodiment thereof comprising a body member 10 made preferably of insulating material such as phenolic fibre or bakelized canvas. Within body 10 is provided a U-shaped slot 11 through which the conductor may be looped for the purpose of attaching the support. Slot 11 is provided with two longitudinally spaced portions extending transversely of the supporting body 10, these transverse slots being somewhat larger than the diameter of the conductor or wires to be supported, and forming a pair of opposed faces at each end of slot 11. The face portion of body 10 is reduced inwardly to provide inclined surfaces adjacent the opposed faces preferably from both directions indicated at 12, 13, 14 and 15, as can clearly be seen by reference to Fig. 1A. The edges of these inclined faces are rounded to avoid sharp edges which would tend to prevent relative movement between the wire and support, to avoid injury to the insulation. At one end of body 10 is provided a keyhole shaped opening 16 and centrally disposed with respect to slot is a further keyhole shaped opening 17. A supporting bale 18 provided with offset portions 19 and oppositely directed extensions 20 are provided. This bale 18 may be inserted in the keyhole opening by turning bale 18 at approximately 90° to the position it is to assume during use, and inserting it through the openings 16 or 17. Extensions 20 are of such length that they may be passed through the openings in this position. Then by turning bale 18 to 90° the supporting body will be held on extending offset portion 19 of the bale, while the extensions 20 will retain it in place.

In use the wire 25 is looped through the opening 11 and forced laterally into the slot so that the wire will be opposite the inclined faces 12, 13, 14 and 15, as shown in Fig. 1A. Accordingly, when any strain is applied to the wire it will tend to draw more tightly into the clamp and hold firmly. In practice it has been determined that the wire so inserted will be held in place against any ordinary tensile strain. Since there are no parts of the support which must be bent into place to hold the wire, the body member 10 need not be made of metal or other material which will withstand bending stresses. Furthermore, since there is no tight gripping into the insulation of the wire, the insulation is not damaged by use of the supports. Furthermore, when insulating material is used in the body portion, any wear upon the insulation of the conductor member will not tend to cause a short circuiting by the clamp itself, as in the case of metal clamps.

Figure 2:
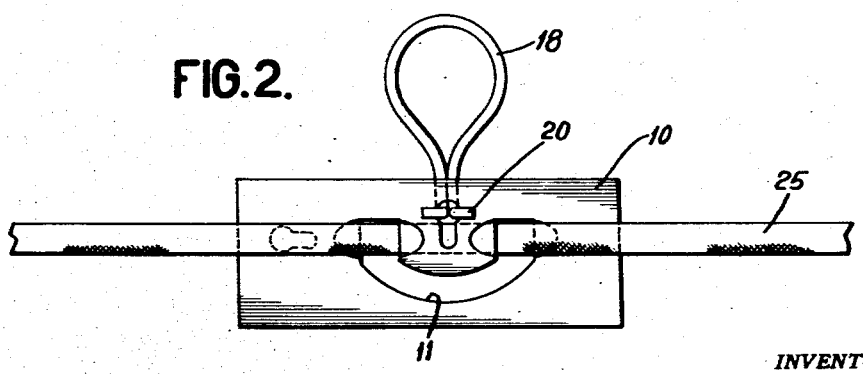
Fig. 2 illustrates in plan view the drop wire support of Fig. 1 utilized as a clip.

It is often desired to support wire from a pole or other support and to provide clips to hold this wire substantially in horizontal position. When such a use is desired, it is merely necessary in the arrangement in accordance with my invention to remove bale 18 from the hole 16 and replace it in hole 17. With this change the conductor support, as shown in Fig. 2, is obtained. Accordingly, it is clear that this supporting arrangement may be used either as a terminal clamp or as an intermediate supporting clip for any wire that will go into the slot.

In Figs. 4 and 4A is disclosed another embodiment of my invention. This arrangement like that shown in Figs. 1, 1A and 2, comprises a supporting body 10 and a supporting bale 18, together with keyhole shaped perforations 16 and 17. In this arrangement, however, instead of providing a slot 11 within the material itself, two transverse slots 21, 22 are provided. Thus, the wire-receiving open area in the body no longer is in the form of a perforation but comprises merely two transverse slots as shown. The portion of slots 21, 22 adjacent the main body form 10 are provided with inclined face members 12, 13, 14 and 15, similar to those of Figs. 1 and 1A. The conductor is supported in the arrangement shown in Figs. 4, 4A and 5, in the same manner as in the embodiment shown in Figs. 1, 1A and 2. This arrangement, however, has the advantage that it may be readily applied to the conductor merely by bending the conductor slightly and sliding the body portion 10 over the conductor. However, in many cases the other forms shown in Figs. 1 and 1A may be preferable.

Figure 3:
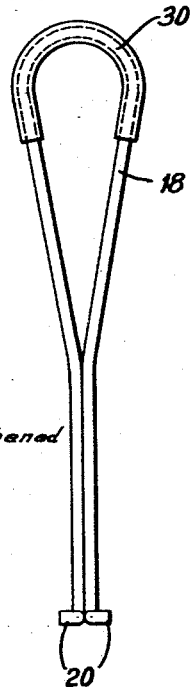
Fig. 3 is a modified form of a bale for mounting the wire support.

According to my invention bales of different lengths of material may be substituted in the field as is obvious from the construction. Any desired material may be used for the bales and since it is readily interchangeable, material which is deformable is not generally needed in the bale. Accordingly, it is generally preferable to use relatively stiff metal such as hardened bronze for the bales as they may then be made smaller and lighter in weight. When it is desired to mount the support on glass or porcelain insulator a soft metal and longer bale are required. Such a bale is illustrated in Fig. 3. These loops may be made of soft copper wire and fitted with a copper sleeve over the upper end thereof so as to prevent the soft copper wire from wearing through at the point fitted over an insulator.

If it is necessary to increase the friction of the wire, the portions of the surfaces contacting the wire may be roughened or corrugated. However, in general this is found not to be necessary since sufficient grip is obtained merely by the formation of the body member.

If desired the body member may be made in a curved form to give more contact surface and increase the friction. An arrangement of this type is shown in Figs. 5 and 5A. In this figure the body portion is made with a central curved portions 36, two parts connected to the end portion by straight disposed portions 34, 35. The slot for retaining the wire 25 can be provided by curving a small portion of this body in conformity with the curvature of the main body, leaving portions projecting as shown at 37, 38, 39 and 40, to retain the wire from lateral displacement. In this arrangement another form of bale 28 is disclosed which fits through two perforations 31, 32, as shown. This type of bale is preferable with this form of the body member since the curvature thereof prevents a straight bale structure as shown at 18, in Figs. 1 and 4, from hanging straight. This is particularly true when the bale is arranged on the side of the member so as to form a clip.

In certain cases the support may be required to withstand great strain, for example, a tension of the order of 300 pounds or more. In such cases the support of Figs. 1 and 1A may be modified as shown in Figs. 6 and 6A. This support is generally similar to that described above but has an additional slot 70 provided with inclined faces 71, 72 similar to faces 12, 13. The wire to be supported is looped through this slot, the added loop and slot providing greater resistance against slipping of the conductor.

Fig. 7 illustrates an arrangement according to Figs. 4 and 4A provided with the additional slot similar to that of Fig. 6.

Figure 8:
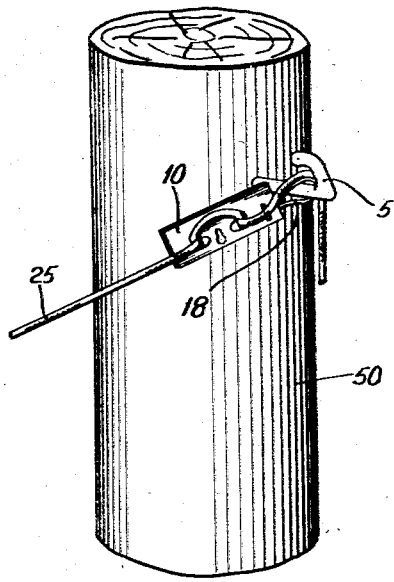
Figs. 8, 9 and 10 illustrate various arrangements utilizing a drop wire support in accordance with my invention.
Figure 9:
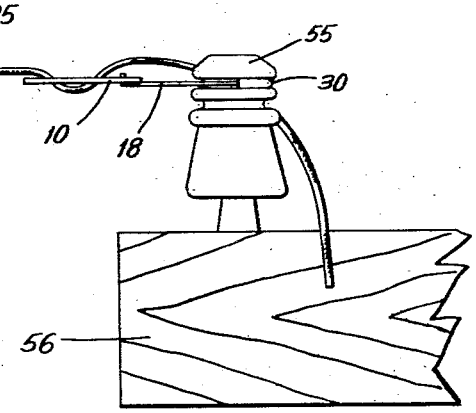
Figure 10:
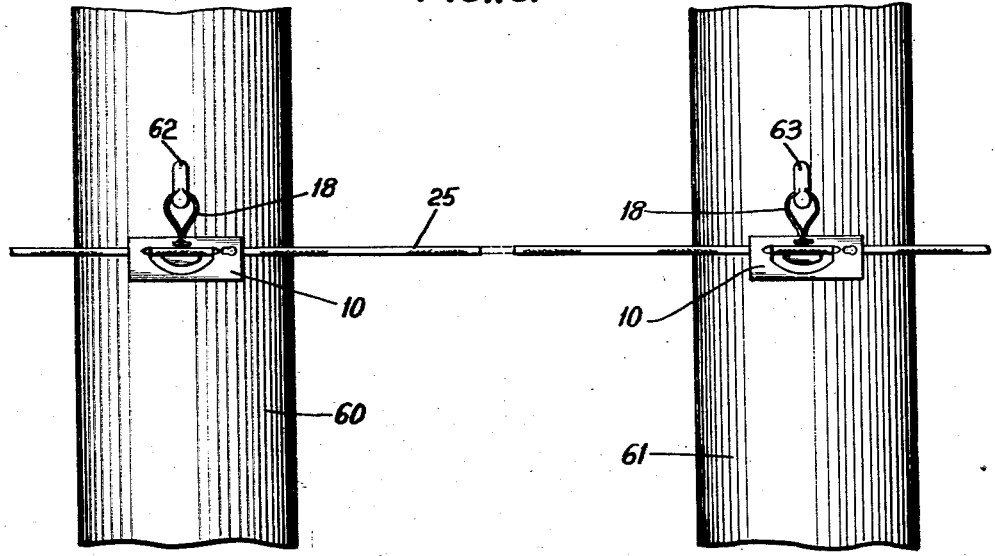

In Figs. 8, 9, and 10, installation examples of applicant's new support are shown. In Fig. 8 is shown a pole 50 in which is featured a hook 57. A wire 25 is brought up to a supporting member 10 which is retained in place on hooks 57 by bale member 18. This shows the use of the supporting member in replacing the present clamp arrangement.

In Fig. 9 the support member 10, for wire 25, is shown provided with a long bale 18 such as shown in Fig. 3 arranged about a glass insulating member 55 mounted on a cross-arm 56.

In Fig. 10 the use of the supporting member as a clip for supporting wires, is shown. In this arrangement the wire 25 is supported between two poles 60, 61 by supports 10 hung on hooks 62, 63, by means of bale member 18.

While I have disclosed a few preferred embodiments of my invention it should be distinctly understood that these arrangements are used merely by way of example, and not as a limitation on the scope of my invention. Many modifications of my invention may be made within the teachings thereof without departing from the spirit and scope thereof. What I consider my invention and upon which I desire to secure protection is embodied in the accompanying claims.

What I claim is:

1. A support for an electric conductor comprising a single plate like body, means to hold a wire by friction against tensile strains in either direction comprising an opening in said body, a member extending into said opening over which a loop of the wire to be supported may be passed, symmetrically disposed grooves in said member and other grooves formed in said body aligned therewith forming guideways to receive a wire loop from either side of the plate, and means to support said body.

2. A support for an electric conductor comprising a single plate-like body made of impregnated fiber insulating material, means for holding a wire by friction against tensile strain in either direction comprising two laterally displaced transverse slots in said body forming a member on said body over which a loop of wire may be passed, symmetrically disposed grooves in said member and other grooves formed in said body aligned therewith forming guideways to receive a wire loop from either side of said plate and means to support said body.

3. A support according to claim 2 wherein the surface of said grooves is roughened to provide greater friction.

ERNEST S. McLARN.